United States Patent [19]

Simpson

[11] Patent Number: 4,503,653
[45] Date of Patent: Mar. 12, 1985

[54] STRUCTURAL BRACING SYSTEM

[75] Inventor: Harold G. Simpson, Oklahoma City, Okla.

[73] Assignee: Encon Products, Inc., Oklahoma City, Okla.

[21] Appl. No.: 428,459

[22] Filed: Sep. 30, 1982

Related U.S. Application Data

[63] Continuation-in-part of Ser. No. 306,662, Sep. 29, 1981, which is a continuation-in-part of Ser. No. 93,173, Nov. 3, 1979, Pat. No. 4,329,823.

[51] Int. Cl.³ .............................................. E04C 2/42
[52] U.S. Cl. ...................................... 52/664; 52/693; 52/741
[58] Field of Search ................. 52/407, 410, 478, 508, 52/690, 665, 480, 664, 693, 741, 648

[56] References Cited

U.S. PATENT DOCUMENTS

| | | | |
|---|---|---|---|
| 1,458,498 | 6/1923 | Piel | 52/693 |
| 1,694,514 | 12/1928 | Naugle et al. | 52/690 X |
| 4,022,537 | 5/1977 | Gilb et al. | 52/665 X |
| 4,402,168 | 9/1983 | Marer, Jr. | 52/478 |
| 4,406,106 | 9/1983 | Dinges | 52/478 |

*Primary Examiner*—Carl D. Friedman
*Attorney, Agent, or Firm*—Bill D. McCarthy

[57] ABSTRACT

An improved bracing system for a building system having a primary structure on which are supported secondary structural systems such as purlins, a tertiary structural system supported by the secondary structural system, and a first bracing system which interconnects a selected portion of the tertiary structural system to the primary structural system so that the tertiary structural system is restricted from translational and rotational movement as the tertiary structural system is subject to load and other of the tertiary support systems are allowed to flex with their elastic limits as the roof expands and contracts. A second bracing system interconnects to and extends between a portion of the secondary structural system and the primary structure so that the secondary structural system is restricted from translational movement and from rotational movement as the secondary structural system is subjected to load.

15 Claims, 11 Drawing Figures

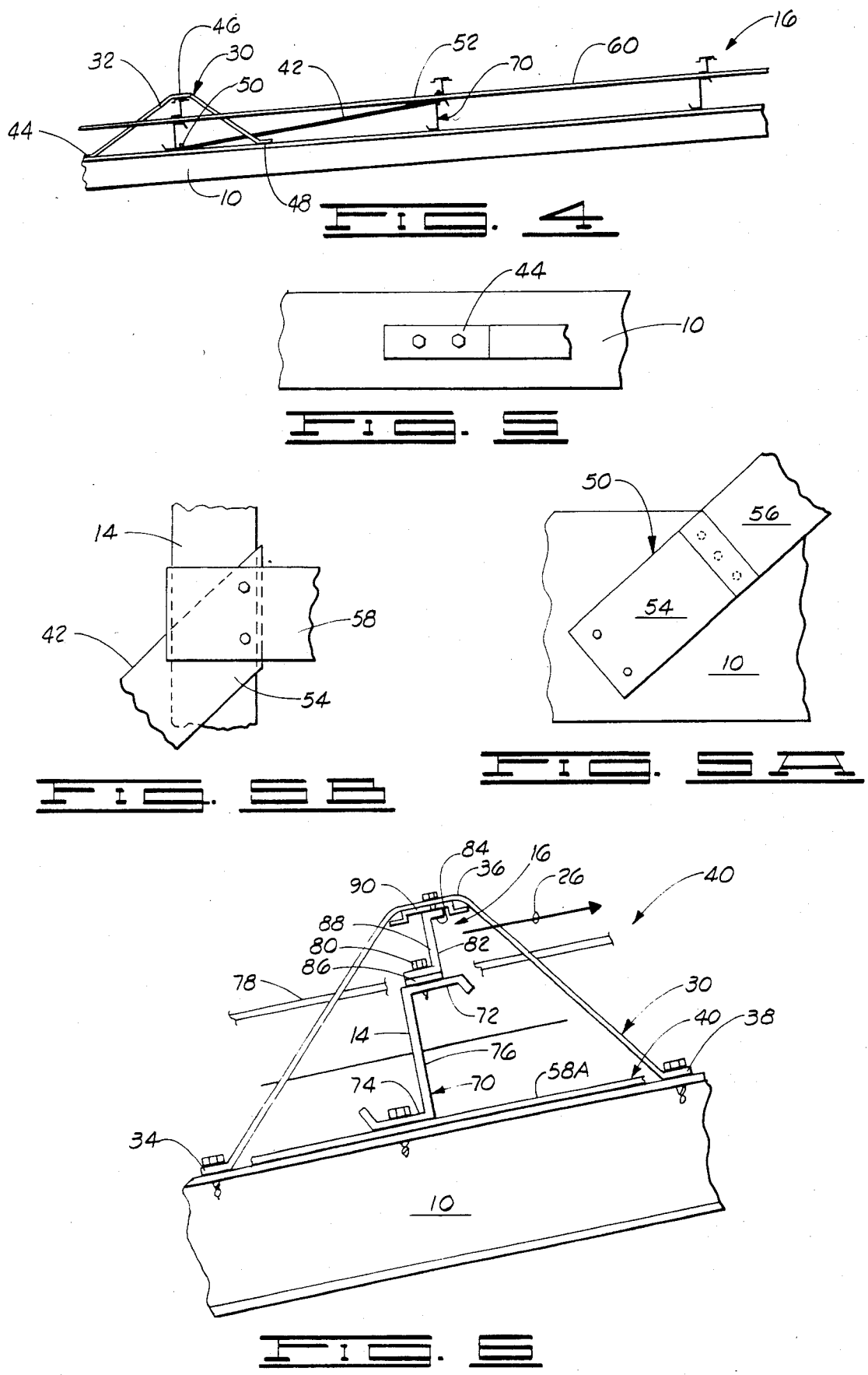

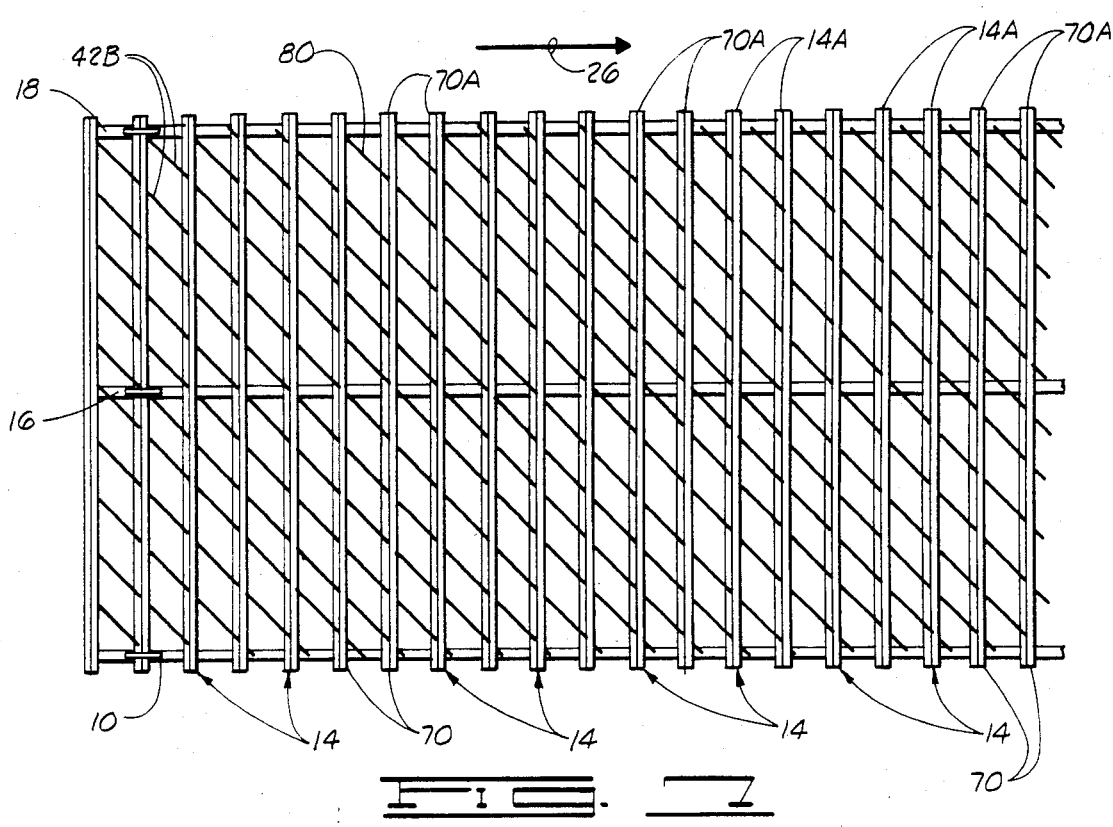
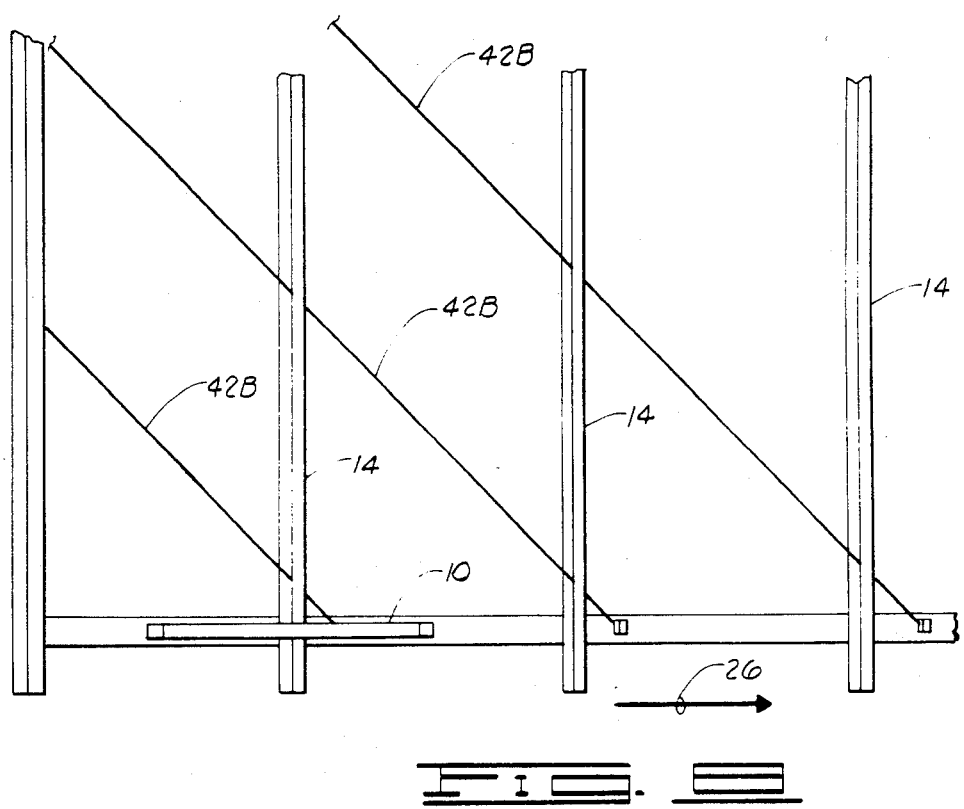

STRUCTURAL BRACING SYSTEM

CROSS REFERENCE TO RELATED APPLICATION

This application is a continuation-in-part of my co-pending application Ser. No. 306,662, entitled "Structural Bracing System," filed Sept. 29, 1981, which is a continuation-in-part of application Ser. No. 93,173, entitled "Support Spacer Apparatus," filed Nov. 3, 1979, now U.S. Pat. No. 4,329,823.

BACKGROUND OF THE INVENTION

The present invention relates to building assemblies having purlin type secondary structural members supported by underlying primary structural members and tertiary structural members supported by the purlin type secondary structural members and more particularly, but not by way of limitation, to a structural bracing system and methods for stabilizing such tertiary structural members to minimize or prevent compressive stress failures. In one aspect, the present invention relates to a structural bracing system and methods for stabilizing purlin type secondary structural members and tertiary structural members to increase the load carrying capacity of the secondary and tertiary structural members by substantially restricting the translation and rotation of the secondary and tertiary structural members.

Purlins are generally relatively long Z-shaped or C-shaped members that are bolted to extend across metal roof beams that form part of the primary structure of a metal building, such building frequently referred to as a pre-engineered building. A roof assembly is constructed over the purlins and most frequently consists of layered insulation battings and roofing panels attached to the tops of the purlins.

It is well known that a metal panel roof supported by underlying purlins must transfer load to the primary building structure through the purlins. This load will be both from live loads (ambient elements of nature, repairmen, temporarily stored roofing materials, etc.) and from dead loads (permanently installed air conditioners, etc.).

It is in particular the live load conditions which alternately place building purlins in tensional and compressive stress. While attempts have been made by prior art teachings to strengthen a purlin system with bracing, none have been as totally compensatory for both purlin tensional and compressive stressing as presented by the present invention.

SUMMARY OF THE INVENTION

Briefly described, the present invention comprises an improved bracing system for a building system having a primary structure on which are supported secondary structural systems such as purlins, a tertiary structural system supported by the secondary structural system, and a first bracing system which interconnects a portion of the tertiary structural system to the primary structural system so that the tertiary structural system is restricted from translational and rotational movement as the tertiary structural system is subject to load. The present invention further comprises a second bracing system which interconnects to and extends between a portion of the secondary structural system and the primary structure so that the secondary structural system is restricted from translational movement and from rotational movement as the secondary structural system is subjected to load.

Accordingly, an object of the present invention is to provide an improved structural bracing system to stabilize tertiary structural members of a pre-engineered building roof from translational and rotational movement under load transference conditions.

Another object of the present invention is to provide an improved structural bracing system to stabilize secondary and tertiary structural members of a pre-engineered building roof from translational and rotational movement under load transference conditions.

Another object of the present invention, while achieving the above stated object, is to provide an improved structural bracing system for secondary and tertiary structural members of a pre-engineered building roof which is easily installed and is cost effective.

Other objects, features and advantages of the present invention will become apparent upon reading the following specification in conjunction with the accompanying drawings and appended claims.

BRIEF DESCRIPTION OF THE DRAWINGS

FIG. 4 is a side elevational view in semi-schematical detail of a portion of the system shown in FIG. 2.

FIG. 5 is a top plan view of a strap end attachment of the tertiary structural member bracing system to a rafter.

FIG. 5A is a top plan view of a strap end attachment of the secondary structural member bracing system to a rafter.

FIG. 5B is a top plan view of an intersection of a lateral bracing strap and an angled bracing strap of the secondary structural member bracing system at an underlying purlin.

FIG. 6 is a side elevational, cross-sectional view of a purlin supported by a rafter and a tertiary structural member supported by the purlin, the purlin and tertiary structural member being braced against translational and rotational movement by the bracing system of the present invention.

FIG. 7 is a top plan view of another purlin secondary structural system supporting a tertiary structural system and bracing system for stabilizing such secondary and tertiary systems in accordance with the present invention.

FIG. 8 is an enlarged view of a portion of the bracing system shown in FIG. 7.

DESCRIPTION

The construction of a pre-engineered or metal building involves the establishment of a load bearing foundation, the erection of a primary structural system on the foundation which normally defines the building enclosure, the attachment of a secondary structural system to the primary structural system, the attachment of a tertiary structural system to the secondary structural systems, and the attachment of an enclosure system, usually a wall and roof panel facade, to the secondary structural system via the tertiary structural system to form a building envelope to enclose the interior building space.

Figure 1:
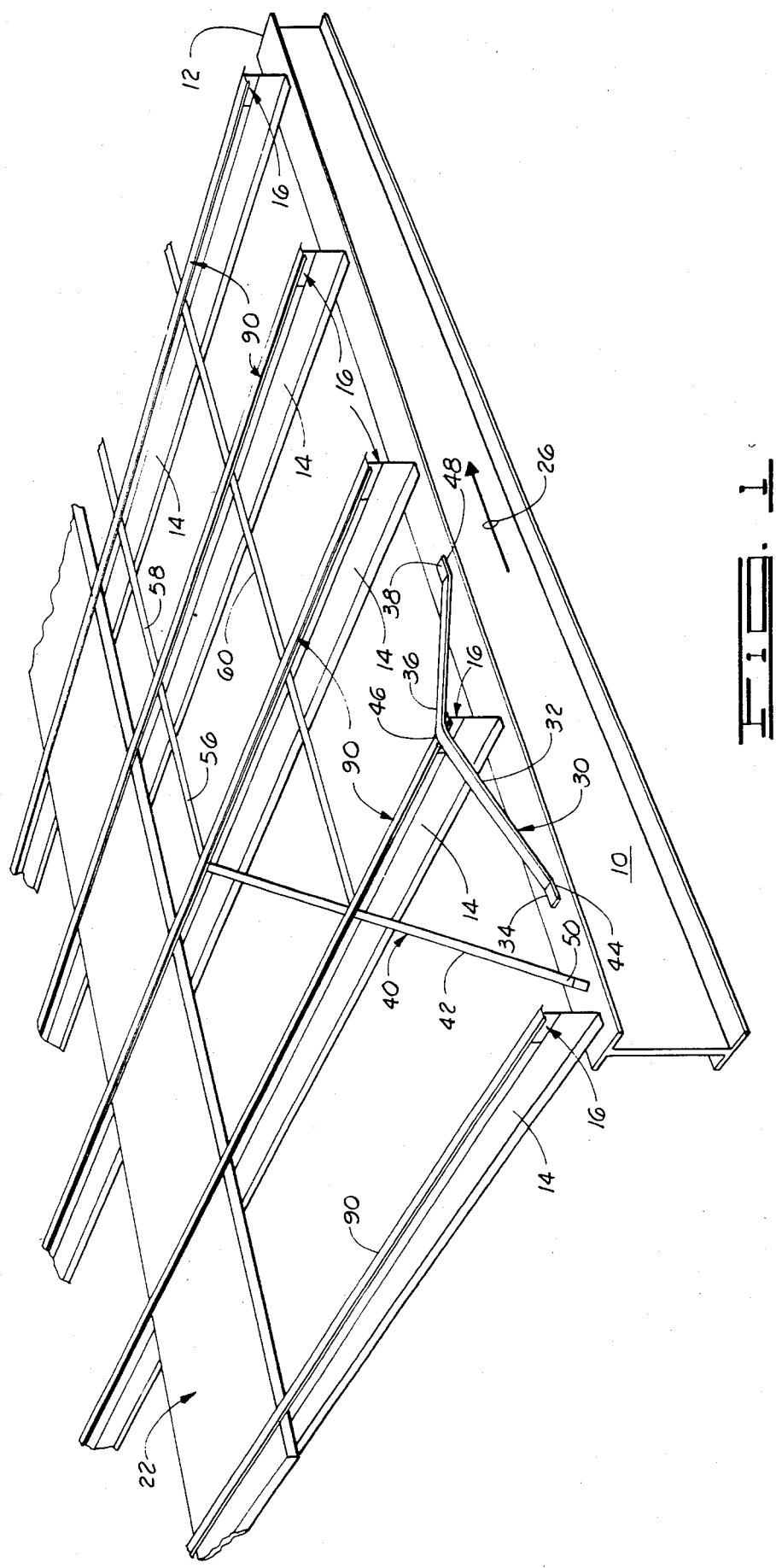
FIG. 1 is a perspective view in semi-schematical detail representation of a portion of a building roofing system in which several purlins are supported at one point by a rafter, each of the purlins supports a tertiary structural member, a single batting of insulation is depicted over a portion of the purlins, and a structural bracing system is provided in accordance with the present invention.

Representative portions of such a building are depicted in FIG. 1 in which a primary structural member 10 of a primary structural system 12 is shown with one end of each of a plurality of substantially parallel secondary structural members 14 supported thereon. A plurality of tertiary support assemblies 16, such as panel support assemblies, are supported by each of the secondary structural members 14 as shown in the drawing. The primary structural member 10 will also be referred to herein as an I-beam rafter; the secondary structural members 14 will also be referred to herein as purlins; and the tertiary support assemblies 16 will also be referred to herein as panel support assemblies. While the presently described embodiment will involve Z-shaped purlins (the cross-section generally has the shape of a "Z"), the present invention is also applicable to other purlins, such as C-shaped purlins.

Figure 2:
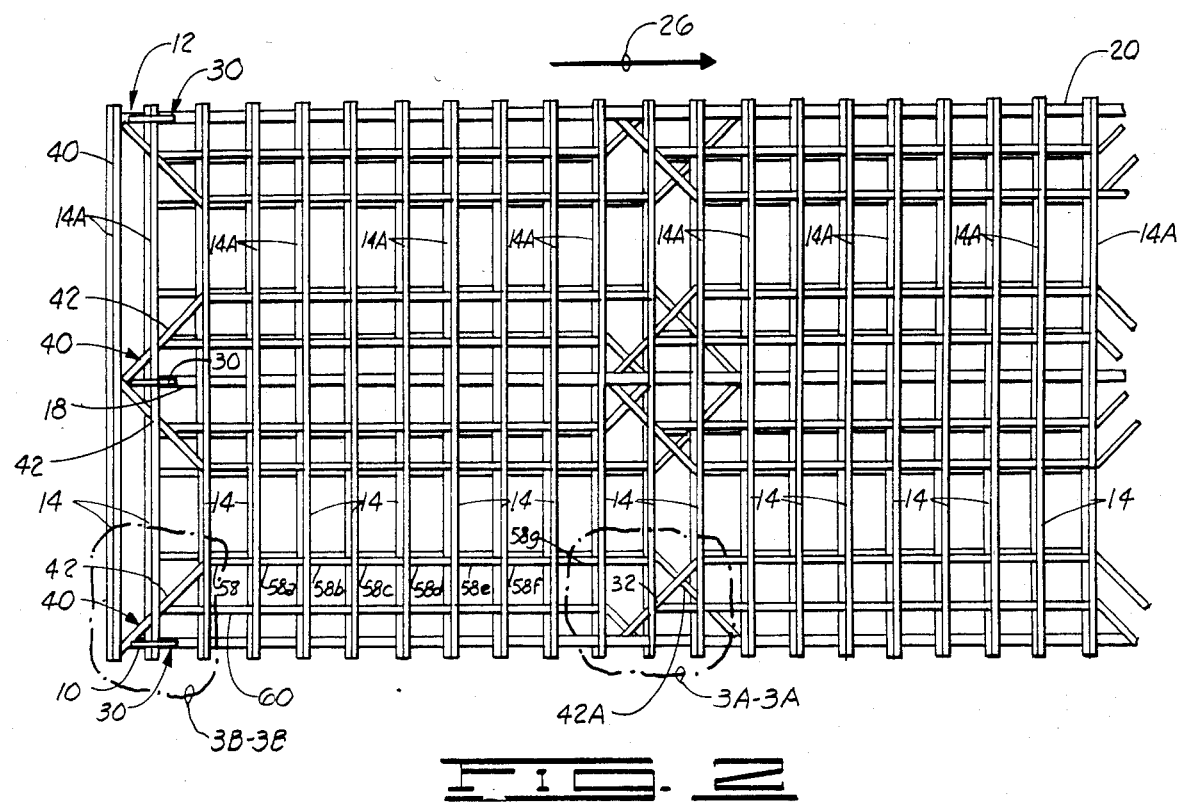
FIG. 2 is a top plan view of a purlin secondary structural system supported by rafters, a tertiary structural system supported by the secondary structural system, and a bracing system for stabilizing the secondary and tertiary structural member in accordance with the present invention.

As shown in FIG. 2, each secondary structural member 14 is supported at a second point by another primary structural member 18 which is substantially parallel to the primary structural member 10. Each of the primary structural members 10, 18 is an I-beam rafter and the distance between these spaced apart members is referred to as a bay. It will be understood that the primary structural members 10, 18 are supported by other portions of the primary structural system 12, such as vertically extending column members (not shown), which are in turn supported by a foundation pad (also not shown).

As depicted in FIG. 2, the secondary structural members 14 span a bay; that is, the secondary structural members 14 are supported at points by the primary structural members 10, 18, and intermediate portions of the secondary structural members 14 overlay the opening between these primary structural members. In such case, other identical secondary structural members 14A are disposed in longitudinal alignment with, and interconnected to, respective secondary structural members 14 via appropriate bolting so as to extend across other bays, such as created by the spaced apart and substantially parallel third primary structural member 20 shown in FIG. 2. It will be appreciated that multiple bay spanning secondary structural members are known and the present invention is not limited by the bay spanning capacity of the secondary structural members 14.

Also shown in FIG. 1 is a single insulation batting 22 which is depicted as a layer which extends normally across the tops of the secondary structural members and below the tertiary support system 16. While a single insulation batting 22 is shown, it will be understood that in actual construction multiple insulation battings are disposed in juxtaposition to form a continuous layer over the secondary structural members 14, 14A. The roof panels (not shown) are attached to the tertiary support assemblies 16 via a plurality of self-tapping and self-drilling screws (also not shown).

The present invention addresses the problem of transferring load from loading conditions that are placed on the building assembly depicted and described with reference to FIGS. 1 and 2. Such loads, as indicated above, can occur from live loads, which are transient or changing loads caused by nature (such as snow, wind, rain) and from the presence of temporary loads such as caused by a repairman and his temporarily stacked materials. Other loads are sometimes referred to as dead loads, which are those loads which occur from permanently supported articles, such as roof mounted air conditioners. Live loads will cause either an inwardly directed force or an outwardly directed force on the exterior envelope of a building, and it is known that these imposed loads will vary in time and magnitude as they are applied to the roof and wall facade and the loads are transferred to the purlins. The structural principles of discussed briefly herein are discussed in more detail elsewhere, such as in the "Specification for the Design of Cold-Formed Steel Structural Members," *American Iron and Steel Institute*, Sept. 3, 1980; also, "Commentary on the 1968 Edition of the Specification for the Design of Cold-Formed Steel Structural Members," *American Iron and Steel Institute*, 7th Printing March 1977. See also the article entitled "What Makes A Metal Building System" by Duane S. Ellifritt, an article that appeared in the *Metal Building Review* magazine dated August, 1981. Publications such as this discuss these principles in a general manner, and provide some understanding as to paths of load transference through purlins. Prior art building systems have dealt with bracing secondary structural members in a variety of manners to increase the capability of purlins to endure the loading imposed thereon, but none of the prior art systems have satisfactorily dealt with the problem for all loading conditions.

Returning now to FIG. 1, shown therein is the improved bracing system 30 for stabilizing the tertiary support assembly 16 supported by the secondary structural member 14 constructed in accordance with the present invention. FIG. 1 is a perspective view in semi-schematical detail representation of a portion of a building roofing system, and for purpose of this discussion, it will be determined that the arrow designated 26 indicates the upslope direction of the roofing system. The bracing system 30 for stabilizing the tertiary support assembly 16 comprises a tensile strap brace 32 having a first end 34, a medial portion 36, and a opposed second end 38. The first end 34 of the tensile strap brace 32 is connected to the primary structural member 10 and the opposed second end 38 of the tensile strap brace 32 is connected to the primary structural member such that the medial portion 36 is disposed over and engages the tertiary support assembly 16 substantially as shown in FIG. 1. While this pattern is repeated at several areas of the building roofing system shown in FIG. 2, such as the points of attachment of the roofing system to the primary structural members, other tertiary support assemblies 16 employed to connect other portions of the roofing system are not braced with the bracing system 30 so that such unbraced tertiary support assemblies are allowed to move in unison with the roofing system as the roofing system changes shape because of expansion and contraction or other forces. While the bracing System 30 has been shown as the tensile strap brace 32, it is to be understood that other means, such as a brace member capable of resisting both tensile and compressive loads can be utilized in the practice of the subject invention. In such case a single member can be secured at one end to the primary structure and at the other end to the tertiary support assembly 16.

A secondary structural member bracing system 40 comprises a series of diagonal braces 42 which are tensile straps connected to the primary structural members, such as the primary structural member 10. Each of the diagonal braces 42 is connected at one end thereof to the primary structural member so that the diagonal brace 42 extends obliquely from the primary structural member and connects to one or more of the secondary structural members 14 at intermediate portions thereof. (As used herein, the term oblique will mean that the diagonal braces 42 extend from the primary structural members at an angle that is not perpendicular.)

While this pattern is repeated at several areas of the building roofing system shown in FIG. 2, FIG. 1 shows only one of the diagonal braces 42 and the other bracing connected thereto which will be further described hereinbelow.

Figure 3A:
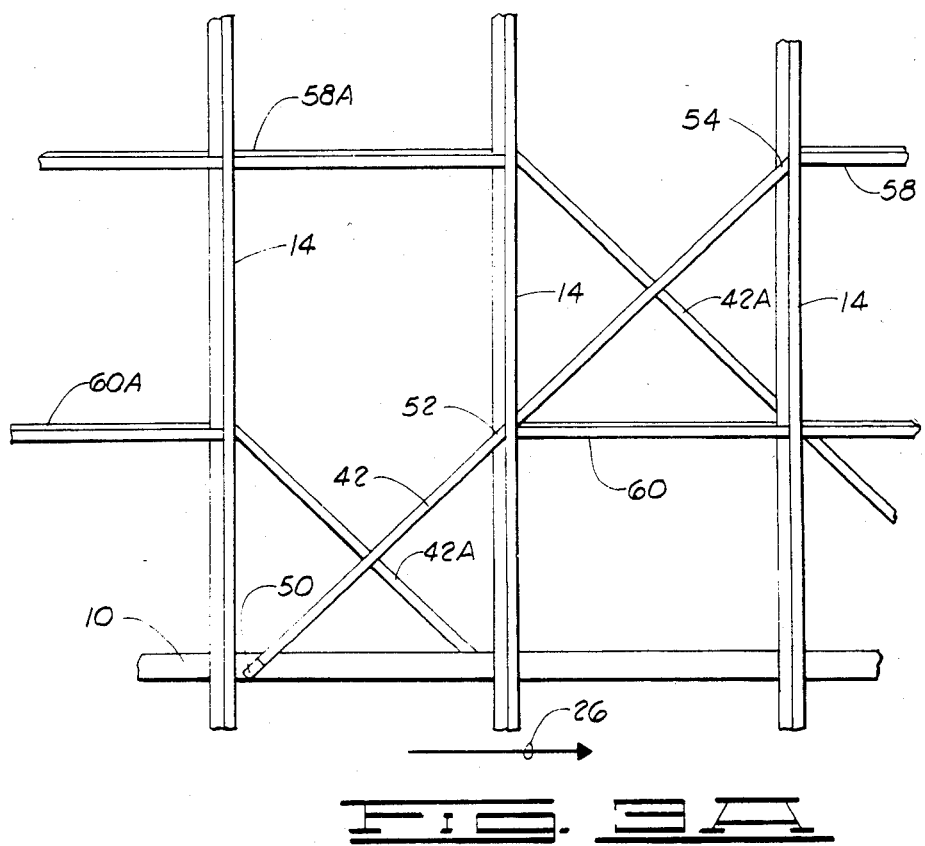
FIG. 3A is an enlarged view of a portion of the system shown in FIG. 2, said portion designated View 3A—3A in FIG. 2.

An enlarged area designated view 3A—3A of FIG. 2 is depicted in FIG. 3A. The diagonal brace 42 is attached to the primary structural member 10 at the juncture point 50, to the first one of the adjacent purlin 14 at the juncture point 52, and to the second one of the next adjacent purlin 14 at the juncture point 54.

Figure 3B:
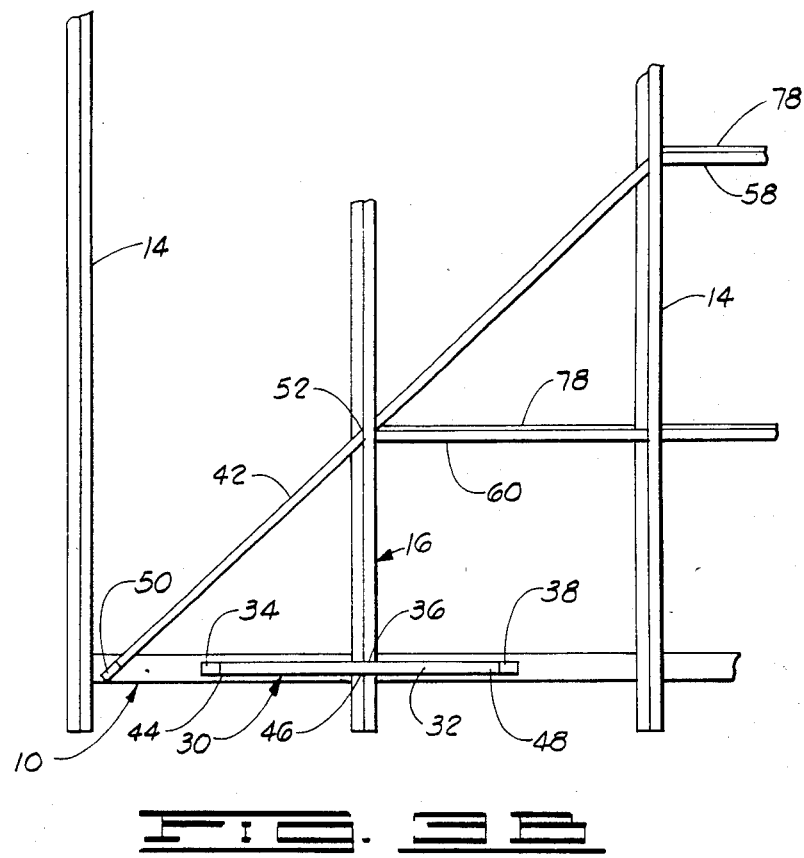
FIG. 3B is an enlarged view of a portion of the system shown in FIG. 2, said portion designated view 3B—3B in FIG. 2.

An enlarged area designated View 3B—3B of FIG. 2 is depicted in FIG. 3B. The tensile strap brace 32 of the bracing system 30 is attached via the first end 34 to the primary structural member 10 via the first end 34 at juncture point 44, to the tertiary support assembly 16 via the medial portion 36 at junction point 46, and to the primary structure 10 via the opposed second end 38 at juncture point 48.

FIG. 4 shows a side view representation of the tensile strap brace 32 of the bracing system 30 as it extends from the structural member 10 at juncture points 44, 48 so as to be disposed over the tertiary support assembly 16 at the juncture point 46; and the diagonal brace 42 as it extends obliquely from the primary structural member 10 from the juncture point 50.

FIG. 5 is an enlarged view of the juncture point 44. FIG. 5A is an enlarged view of the juncture point 50, and may comprise an attachment pad 55 bolted to the primary structural member 10 and a span portion 56 which extends between the primary structural members 10 and the secondary structural members 14.

FIG. 5B is a top view of the juncture point 54. As will become clear below, the diagonal braces 42 attach to and extend obliquely from the primary structural members 10 and connect to the intermediate portions of the secondary structural members 14. The purpose of these diagonal braces 42 is to increase the load carrying capacity of the secondary structural members 14 by restricting the translation and rotation of the secondary structural members 14. This is accomplished by causing load to occur in the diagonal braces 42. While the presently described embodiments will discuss the invention with the use of preferred tensile loaded transfer bracing, it will be appreciated that compressive loaded transfer bracing can also be utilized.

The secondary structural member bracing system 40 also comprises a series of parallel straps 58 which laterally stabilize others of the secondary structural members 14 and which attach to the diagonal braces 42 in such a manner that load transference is carried therethrough. A first one of the parallel straps 58 is attached to the secondary structural members 14 at juncture point 54 as shown in FIGS. 3A and 5B, and extends substantially parallel to the primary structural members 10 and substantially perpendicularly to the secondary structural members 14. Additional portions of the parallel straps 58 extend in like manner over adjacent secondary structural members 14 and boltingly attached to other secondary structural member 14 over which they pass. For identification purposes, these additional portions of the parallel strap 58 are designated 58a through 58g in FIG. 2. Each diagonal brace 42 can be attached to one or more of the parallel straps 58. In the presently described embodiment, a parallel strap 60 is attached to the secondary structural member 14 at juncture point 52 as shown in FIGS. 2 and 3A and 3B, and extends substantially parallel to the primary structural member 10 and substantially perpendicular to the secondary structural members 14. In the manner described for the parallel strap 58, additional portions of the parallel strap 60 extend over adjacent secondary structural members 14 and boltingly attach to each secondary structural members 14 which the strap 60 passes.

FIG. 6 is a side cross-sectional view of a purlin 70 which is employed as the secondary structural member 14. The purlin 70 is supported by the primary structural member 10. The purlin 70 comprises an upper flange 72 and lower flange 74 which are substantially parallel to each other and which are interconnected by a flat web portion 76. The upper and lower flanges 72, 74 are asymmetrical to the web portion 76; that is, the flanges 72, 74 are not symmetrical to the plane of the web portion 76. A downwardly directed load on the purlin 70 will have vector components which will attempt to rotate and translate the purlin 70 in a known manner. For such inwardly directed loads, the center portion of upper flange 72 between primary structural members 10, 18, 20 will be placed in compression. Similarly, an outwardly directed load, such as caused by wind load, will stress the purlin 70 such as to place the lower flange 74 in compression. The placement of the secondary structural bracing system 40 as hereinabove described will serve to stabilize the purlins 70 for an inwardly directed load. In order to provide bracing for an outwardly directed load, the secondary structural bracing system 70 will be placed substantially as follows.

The secondary structural bracing system 40 also comprises a series of parallel straps 78 which pass under the purlins 70 and connect to diagonal braces 42A as shown in FIGS. 2, 3A and 3B. Also, a series of parallel straps 58A and 60A are attached to the purlins 70 at the juncture points of the diagonal braces 42A and extend substantially parallel to the primary structural members 10 and substantially perpendicularly to the secondary structural members 14. Additional portions of these parallel straps extend in like manner under adjacent purlins 70 and boltingly attached to each purlin 70 under which they pass. Each diagonal brace 42A can be attached to one or more parallel straps in the manner described above for the parallel straps 58 and 60. The juncture point connections to the purlins 70 can be the same as described above with relation to FIGS. 5A and 5B.

The above described diagonal braces and parallel straps serve to restrict the secondary structural members, such as purlins, from translation and rotation of the compression elements of the secondary structural members. The diagonal braces serve to transfer the load from their connected purlins to the diagonal braces, and the exact patterns of the diagonal braces and parallel straps are not limiting in the present invention. For example, FIG. 7 shows a top plan view of another secondary structural bracing system 80 in combination with the bracing system 30 for bracing the panel support assemblies 16 which is constructed in accordance with the present invention. In this embodiment, a series of wire diagonal braces 42B extend obliquely from the primary structural members 10, 16, 18 and pass through appropriately located apertures (not shown) spatially disposed at intervals in the flat web portions of the secondary structural members 14, 14A, such as purlins 70, 70A, and interconnect the secondary structural members 14, 14A for restricting the translation and rotation of the compression elements of these secondary structural members. The wire diagonal braces 42B attach to the secondary structural members 14, 14A such as by welding or pressure device and serve to stabilize the secondary structural members in accordance with the present invention. FIG. 8 is an enlarged view of a portion of the secondary structural member bracing system 80 and the bracing system 30 shown in FIG. 7, and more clearly shows the wire diagonal braces 42B passing through the secondary structural members 14 and attached to the primary structural member 10.

Referring again to FIGS. 4 and 6, the tertiary support system 16 is secured to the upper flange 72 of the purlin 70 via a self-tapping and self-drilling screw 80. The tertiary support system 16, which functions as a roof panel support assembly, can be fabricated of metal, plastic or combination of metal and plastic materials. Each of the tertiary support systems 16 comprises a base clip 82 having an upper flange 84 and a lower flange 86 which are substantially parallel to each other and which are interconnected by a flat web portion 88. The upper and lower flanges 84, 86 are asymmetrical to the web portion 88; that is, the flanges 84, 86 are not symmetrical to the plane of the web portion 88. The construction of the base clip 82 provides a stationary clip having the flexing capability of floating clips of much more complex design, since the median flat web portion 88 of the base clips 82 are oriented normally to the longitudinal direction of the roof panels of the building structure. Thus, the median flat web portion 88 has the capability to flex and elastically rotate as the longitudinal thermal expansion of the roof panels occurs.

The tertiary support system 16 also comprises a plurality of panel support beams 90 that are generally elongated channel-shaped members which are arranged in overlaying end-to-end relationship such that the longitudinal axes thereof are substantially parallel to the underlying purlins 70 when attached thereto. These panel support beams 90 are connected to the upper flange 84 of the base clip 82 via bolts or rivets (not shown). This serves to place the panel support beams 90 at a predetermined distance above the underlying purlin 70 for the purpose of providing clearance below the panel support beam 90 in order to permit a layer of insulation to be positioned therewith. The height of the base clip 82 may be established such that an air space can be provided over the layer of insulation and below the panel support beam 90.

A downwardly directed load on the base clip 82 will have vector components which will attempt to rotate and translate the base clip 82 in a known manner. For such inwardly directed loads, the upper flange 84 of the base clip 82 will be placed in bending. Similarly, an outwardly directed load, such as caused by wind load, will stress the base, clip 82 such as to place the lower flange 86 in bending. The placement of the tertiary structural bracing system 30 such that the first end 34 and the opposed second end 38 of the tensile strap brace 32 are secured to the primary structural members 10 and the medial portion 36 of the tensile strap brace 32 is disposed over and secured to the panel support beam 90 will serve to stabilize the base clip 82 and restrict the base clip 82 from translational and rotational movement. While only one base clip 82 and the associated tertiary structural bracing system 30 has been discussed and illustrated, it should be noted in actual practice that one tertiary structural bracing system 30 will stabilize more than one base clip 82. The stability imparted to adjacent base clips 82 is achieved through the stabilizing effect of the roof acting as a single unit to transmit shear, compression or tensile stress from one roof panel to the adjacent roof panel. This enables the building structure to retain its structural integrity and yet allows those roof panels to expand and contract freely and without damaging the roof as temperature changes occur.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the following claims.

I claim:

1. A building assembly having a roof formed thereon comprising:

a primary structure;

a plurality of substantially parallel and spaced apart secondary structural members supported by the primary structure;

at least one tertiary support means for connecting the roof to one of the secondary structural members; and first bracing means interconnecting the tertiary support means and the primary structure for increasing the load carrying capacity of the tertiary support means by substantially restricting the translation and rotation of the tertiary support means while permitting other tertiary support means to flex and accommodate the longitudinal movement of the roof within the elastic limit of the other tertiary support means, the first bracing means comprising a load transfer strap interconnecting the selected tertiary support means to at least one adjacently disposed position on the primary structure, the adjacently disposed position being located a selected distance from the tertiary support means.

2. The building assembly of claim 1 wherein the roof is formed of a plurality of longitudinally extensive roof panel members, and where the tertiary support means comprises:

a base clip having a lower end and a median web portion, the lower end being secured to the secondary structural member such that the web portion of the base clip is extensive normal to the roof panel so that longitudinal movement of the roof panel rotates the web portion of the base clip.

3. The building assembly of claim 2 wherein the tertiary support means further comprises:
at least one panel support beam supported by the base clip, the panel support beam supporting at least a portion of the roof.

4. The building assembly of claim 1 further comprising:
diagonal bracing means, connected to and extending obliquely from the primary structure and connected to at least one of the secondary structural members, for increasing the load carrying capacity of the connected secondary structural members by substantially restricting the translation and rotation of the connected secondary structural members.

5. A building assembly having a roof formed thereon comprising:
a primary structure;
a plurality of substantially parallel and spaced apart secondary structural members supported by the primary structure;
at least one tertiary support means for connecting the roof to one of the secondary structural members;
first bracing means extending to connect the tertiary support means to the primary structure, for increasing the load carrying capacity of the tertiary support means by substantially restricting the translation and rotation of the tertiary support means while permitting other tertiary support means to flex and accommodate the longitudinal movement of the roof within the elastic limit of the other tertiary support means;
diagonal bracing means, connected to and extending obliquely from the primary structure and connected to at least one of the secondary structural members, for increasing the load carrying capacity of the connected secondary structural members by substantially restricting the translation and rotation of the connected secondary structural members; and
parallel bracing means for laterally stabilizing the secondary structural members, the parallel bracing means connected to the diagonal bracing means and attached to at least one other of the secondary structural members.

6. The building assembly of claim 5 in which the secondary structural members are each characterized as a purlin having an upper flange, a lower flange and a web extending therebetween and connecting the upper and lower flanges, the diagonal bracing means characterized as stabilizing the purlins.

7. The building assembly of claim 6 in which the diagonal bracing means and parallel bracing means are each characterized as comprising a plurality of tensile load transferring straps interconnecting the primary structure and the purlins.

8. The building assembly of claim 5 in which the secondary structural members are each characterized as being purlins with each having an upper flange, a lower flange and web extending therebetween and connecting the upper and lower flanges, the diagonal bracing means and parallel bracing means characterized as stabilizing the purlins.

9. The building assembly of claim 8 in which the upper flanges of the purlins are spatially disposed to extend from their respective webs in the same direction, and in which the diagonal bracing means and parallel bracing means are connected to the upper flanges of the purlins.

10. In a building assembly having a plurality of secondary structural members supported by, and disposed to extend generally perpendicularly to, primary structural members, a plurality of tertiary support members supported by the secondary structural members and extensive therefrom, and a roof assembly supported by the tertiary support members, an improved method of bracing selected tertiary support members for increasing the load carrying capacity of tertiary support members comprising:
connecting the selected tertiary support members to primary structural members via a brace connecting to at least a portion of the tertiary support members so that the translation and rotation of such tertiary members are substantially restricted.

11. The method of claim 10 wherein the secondary structural members are braced for increasing the load carrying capacity of the secondary structural members and the selected tertiary structural members supported thereon, the method further comprising:
connecting at least one of the secondary structural members to a primary structure member with a diagonal brace extending obliquely from the primary structure.

12. The method of claim 11 further comprising:
connecting at least one other secondary structural member to the diagonal brace by at least one parallel brace connected to the other secondary structural member and to the diagonal brace.

13. A building assembly having a roof formed thereon comprising:
a primary structure;
a plurality of substantially parallel and spaced apart purlin members supprorted by the primary structure, each purlin member having an upper flange, a lower flange and web extending therebetween and connecting the upper and lower flanges;
at least one tertiary support means for connecting the roof to the purlin members;
first bracing means extending to connect the tertiary support means to the primary structure, for increasing the load carrying capacity of the tertiary support means by substantially restrict the translation and rotation of the tertiary support means while permitting other tertiary support means to flex and accommodate the longitudinal movement of the roof within the elastic limit of the other tertiary support means;
diagonal bracing means, connected to and extending obliquely from the primary structure and connected to at least one of the purlin members, for increasing the load carrying capacity of the connected purlin members by substantially restricting the translation and rotation of the connected purlin members, the upper flanges of the purlin members spatially disposed to extend from their respective webs in the same directions, the diagonal bracing means being connected to the upper flanges of the purlin members;
parallel bracing means for laterally stabilizing the purlin members, the parallel bracing means connected to the diagonal bracing means and attached to at least one other of the purlin members at the upper flanges thereof, the diagonal bracing means and parallel bracing means characterized as stabilizing the purlin members, and the lower flanges of the purlin members spatially disposed to extend from their respective webs in the same direction, and in which other portions of the diagonal bracing means and parallel bracing means are connected to the lower flanges of the purlin members.

14. A building assembly having a roof formed thereon comprising:

a primary structure;

a plurality of substantially parallel and spaced apart purlin members supported by the primary structure, each purlin having an upper flange, a lower flange and a web extending therebetween and connecting the upper and lower flanges;

at least one tertiary structural means for connecting the roof to the purlin members;

first bracing means extending to connect the tertiary support means to the primary structure, for increasing the load carrying capacity of the tertiary support means by substantially restricting the translation and rotation of the tertiary support means while permitting other tertiary support means to flex and accomodate the longitudinal movement of the roof within the elastic limit of the other tertiary support means;

diagonal bracing means, connected to and extending obliquely from the primary structure and extending through and connecting to a plurality of the purlin members, for stabilizing the purlin members and increasing the load carrying capacity of the connected purlin members by substantially restricting the translation and rotation of the connected purlin members; and parallel bracing means for laterally stabilizing the purlin members, the parallel bracing means connected to the diagonal bracing means and attached to at least one other of the purlin members.

15. In a building assembly having a plurality of secondary structural members supported by and disposed to extend generally perpendicularly to primary structural members, a plurality of tertiary support members supported by the secondary structural members and a roof assembly supported by the tertiary support members, an improved method of bracing selected tertiary support members for increasing the load carrying capacity of tertiary support members so that other of the tertiary support members flex and accommodate the longitudinal movement of the roof within the elastic limits of the other tertiary support members, and wherein the secondary structural members are braced for increasing the load carrying capacity of the secondary structural members and the selected tertiary support members supported thereon, the method comprising:

connecting the selected tertiary support members to a primary structural member via brace extending over at least a portion of the tertiary support members;

connecting at least one of the secondary structural members to a primary structure member with a diagonal brace extending obliquely from the primary structure; and connecting at least one other secondary structural member to the diagonal brace by at least one parallel brace connected to the other secondary structural member and to the diagonal brace.

* * * * *